United States Patent [19]

Brennan et al.

[11] Patent Number: 4,830,551

[45] Date of Patent: May 16, 1989

[54] BOILER REPAIR

[75] Inventors: Matthew T. Brennan, Wayland; James A. Moruzzi, Millis, both of Mass.

[73] Assignee: SMA Controls, Inc., Mefield, Mass.

[21] Appl. No.: 131,202

[22] Filed: Dec. 10, 1987

Related U.S. Application Data

[63] Continuation-in-part of Ser. No. 916,302, Oct. 7, 1986, Pat. No. 4,739,688.

[51] Int. Cl.$^4$ .................. B21D 53/02; B23P 6/00; B23P 15/26; B26D 5/08
[52] U.S. Cl. .................. 408/82; 29/157.4; 83/745; 83/574; 408/237; 408/88
[58] Field of Search ............ 83/745, 471, 54, 594; 29/726, 157.4; 408/80, 237, 26, 88, 111, 82; 409/178, 179; 82/4 R, 4 C

[56] References Cited

U.S. PATENT DOCUMENTS

| | | |
|---|---|---|
| 2,014,229 | 12/1935 | Emmons . |
| 2,214,141 | 9/1940 | Mall . |
| 2,589,554 | 3/1952 | Killian . |
| 2,818,892 | 1/1958 | Price . |
| 2,921,492 | 1/1960 | Worth .................. 83/471 |
| 2,973,576 | 3/1961 | Hentke .................. 30/92 |
| 3,046,707 | 7/1962 | Obear .................. 51/178 |
| 3,378,307 | 4/1968 | Dempsey . |
| 3,722,497 | 3/1973 | Hiestand .................. 125/14 |
| 4,091,699 | 5/1978 | Chaze .................. 83/56 |
| 4,181,054 | 1/1980 | Striebig .................. 83/153 |
| 4,320,566 | 3/1982 | Boyer .................. 29/157.4 |
| 4,498,820 | 2/1985 | Brennan .................. 408/82 X |
| 4,601,222 | 7/1986 | Gill .................. 408/82 X |
| 4,633,555 | 1/1987 | Legge .................. 29/157.4 |
| 4,718,201 | 1/1988 | Legge .................. 83/54 X |
| 4,739,688 | 4/1988 | Brennan .................. 83/745 |

Primary Examiner—Donald R. Schran

[57] ABSTRACT

Boiler tube repair apparatus includes elongated guide rail structure for securing to a boiler tube panel adjacent a desired cut region, and three tool assemblies for mounting on the guide rail structure. Each tool assembly includes carriage structure with guide structure for engaging the guide rail structure and support structure on which a tube machining tool is mounted and that defines a tool movement axis dedicated to and coordinated with that tool. Each machining tool includes a drive motor, a manual motor control, a drive shaft and a machining member such as a cutter disc or head.

14 Claims, 6 Drawing Sheets

BOILER REPAIR

This is a continuation-in-part of U.S.S.N. 916,302, filed Oct. 7, 1986 and entitled Boiler Repair. now U.S. Pat. No. 4,739,688

This invention relates to repair of boilers and the like, and more particularly to methods and apparatus for repairing a panel of defective boiler tubes.

Steam generation systems in modern power plants include boilers with banks of steel (and other alloys) tubes that extend vertically for distances frequently in excess of one hundred feet. Such tubes have outer diameters of up to three inches and more with wall thickness of up to about one-half inch, adjacent tubes being connected together with metal membranes. Such tube walls deteriorate due to corrosion and the like, and panel portions of such boiler tube walls require periodic replacement. Typically, repair of such defective boiler tube panels has involved removal of the tube panel by flame cutting, finishing (smoothing and beveling) the ends of the cut tubes, and then inserting and welding in place a replacement panel of tubes -- an expensive and time consuming process. Prior attempts to saw through such tube walls have not been particularly successful as the saw, due to the size and materials of the boiler tubes, cannot be held with sufficient stability to provide a straight cut line by advancing the saw along the line to be cut either by hand or on an appropriate support.

In accordance with one aspect of the invention, a boiler tube panel repair system includes elongated guide rail structure for securing to a boiler tube panel adjacent a desired cut region, and a plurality of processing tool assemblies for mounting on the guide rail structure, each processing tool assembly including a support carriage with guide structure for engaging the guide rail structure. A first tool assembly includes secured to its support carriage that has a plunge cutting axis extending transversely to the guide rail structure; and a cutting tool mounted on the carriage that includes a drive motor, a manual motor control, a drive shaft and a tube cutter disc mounted on the drive shaft for rotation about an axis parallel to the plunge cutting axis. This first processing tool assembly is adapted to sever a panel of tubes to be replaced from adjacent boiler tube structure and provides straight and precise cutting of a panel of boiler tubes with resulting smooth aligned tube end surfaces.

A second processing tool assembly for cutting boiler wall membrane protions adjacent the cut tube end surfaces includes a similar carriage with support structure secured to its carriage that has a membrane cutting axis extending parallel to the guide rail structure; a cutting tool mounted on the main pivot that includes a drive motor, a manual motor control, a drive shaft, and a tube cutter disc mounted on the drive shaft for rotation about an axis perpendicular to the membrane cutting axis, the second tool providing exposed circumferential tube end surfaces that may be quickly and accurately prepped (e.g., beveled) for welding of replacement boiler tubes in place of the removed panel of boiler tubes.

A third processing tool assembly for prepping the exposed tube end surfaces has similar carriage structure with reference axis defining structure fixedly secured to its carriage, the reference axis extending perpendicular to the guide rail structure; and a tube end prepping tool mounted for swiveling movement about the reference axis including a cutter head and a drive motor for rotating the cutter head about an axis parallel to the reference axis for end prepping exposed tube end surfaces for welding of a replacement boiler tube panel to the original boiler tubes.

In accordance with another aspect of the invention, there is provided a process for repairing a panel of defective boiler tubes that includes the steps of mounting elongated guide rail structure on a boiler tube panel adjacent the panel of tubes to be repaired, sequentially disposing a series of tool assemblies on the guide rail structure, each tool assembly including a tube cutting member and carriage structure for engaging the guide rail structure, and then moving the tube cutting tool member relative to its carriage to machine portions of the boiler tube panel. The tube cutting processes and apparatus of the invention enable rapid and efficient repair of defective boiler tube sections and the like including machining steps such as cutting and accurate end prepping for receiving a replacement boiler tube panel that is then welded in place.

In a particular embodiment, the elongated guide rail structure is secured to the boiler tube panel by a plurality of rail supports, each rail support includes an alignment projection whose end is adapted to be positioned immediately adjacent the desired cut line on the boiler tube panel, and a body portion which is adapted to be secured to a boiler tube surface and which carries rail fastening means. Each support carriage includes a frame assembly on which first and second pairs of spaced guide wheels are mounted. Each guide wheel has a V-groove that engages a correspondingly shaped edge surface of the guide rail. Preferably, the first and second tool assemblies each include brake structure for engagement with the guide rail structure to lock the support carriage relative to the boiler tube wall during cutting of tubes or membranes, each brake structure including a brake shoe and an operating member, the shoe being movable by the operating member between a disengaged position and an engaged position in which the shoe is engaged with the surface of the guide rail to lock its cutting tool assembly in place on the rail.

In preferred embodiments, the first tool assembly includes secondary pivot structure secured to the support carriage, plunge cut link structure mounted on the secondary pivot structure that includes a first link connected to the cutting tool and a second link connected between the first link and the secondary pivot axis for manually rotating the cutting tool about the main pivot axis in plunge cutting action through a panel of tubes adjacent the guide rail structure, manually releasable latch structure for holding the cutting tool in raised position; and stabilizing structure on the support carriage for storing the cutting tool assembly in upright position when not in use. In a particular embodiment, the stabilizing structure includes an arm that projects laterally from the longitudinal frame member beneath the cutting tool, the plunge cut link structure includes a coupling which is slidingly received on the second link, and the manually releasable latch structure latches the plunge cut coupling and first link together.

In preferred embodiments, the third tool assembly includes an end prep tool assembly that includes a drive motor and a cutter head that is mounted for rotation about an axis parallel to and offset from the drive motor axis. The cutter head includes a plurality of cutter blade inserts and a body that has a plurality of recesses for receiving the cutter blade inserts, each recess having configured sidewalls which permit the cutter blade inserts to be inserted only in proper orientation and also enhance the security attachment of the blade inserts. A pilot projection coaxial with the axis of rotation of the cutter head is fixed for rotation with the cutter head and adapted to be received within the inner diameter of the tube whose end surface is to be prepped. Preferably, the axis of the cutter head is disposed outwardly of its drive motor and such that end prepping of tubes in a corner or at the end of a panel is facilitated. The tool drive motor is adapted to drive the cutter head in rotation at a speed of at least about 1,000 rpm, and in a particular embodiment, the drive motor is an air motor that drives the cutter head at about 15,000 rpm.

When used in the track system, this end prep tool is fixedly mounted on carriage structure that includes reference axis defining structure that has a reference axis extending transversely to the guide rail structure, and the end prep tool is mounted on the reference axis defining structure for swiveling movement about the reference axis. A drive arrangement coupled between the reference axis defining structure and the end prep tool includes a rack and pinion gear arrangement for moving the cutter head along a path parallel to the reference axis to end prep a boiler tube, such as to provide a suitable bevel (e.g., $37\frac{1}{4}°$) on that tube for subsequent welding. The reference axis defining structure includes a shaft member and the gear arrangement is fixedly clamped to the shaft while allowing swiveling movement of the end prep tool about the reference axis and movement of the end prep tool along a path parallel to the reference axis.

Other features and advantages of the invention will be seen as the following description of a particular embodiment progresses, in conjunction with the drawings, in which:

DESCRIPTION OF PARTICULAR EMBODIMENT

Figure 1:
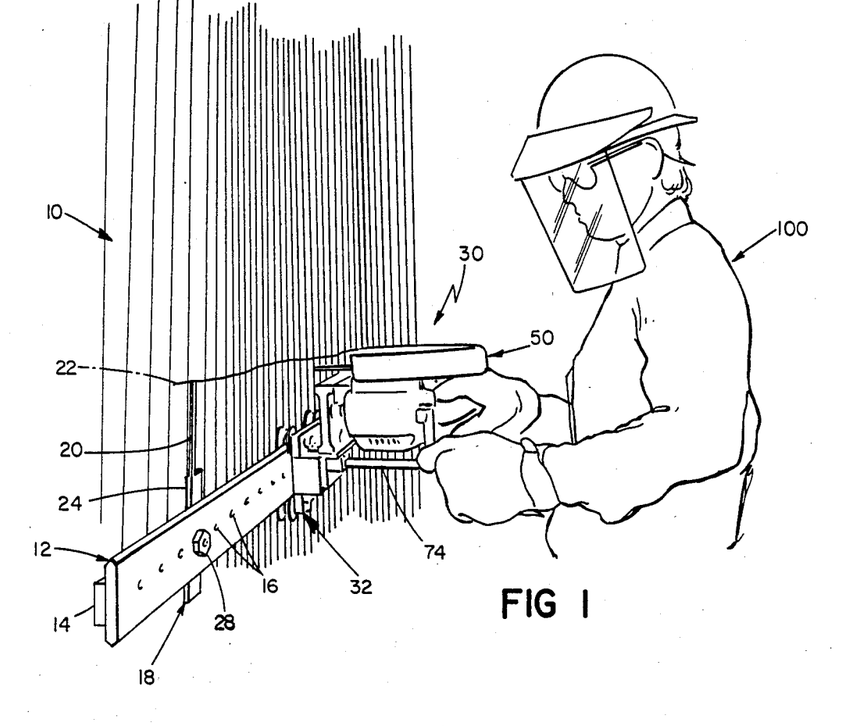
FIG. 1 is a perspective view of components of a boiler tube panel repair system in accordance with the invention.
Figure 2:
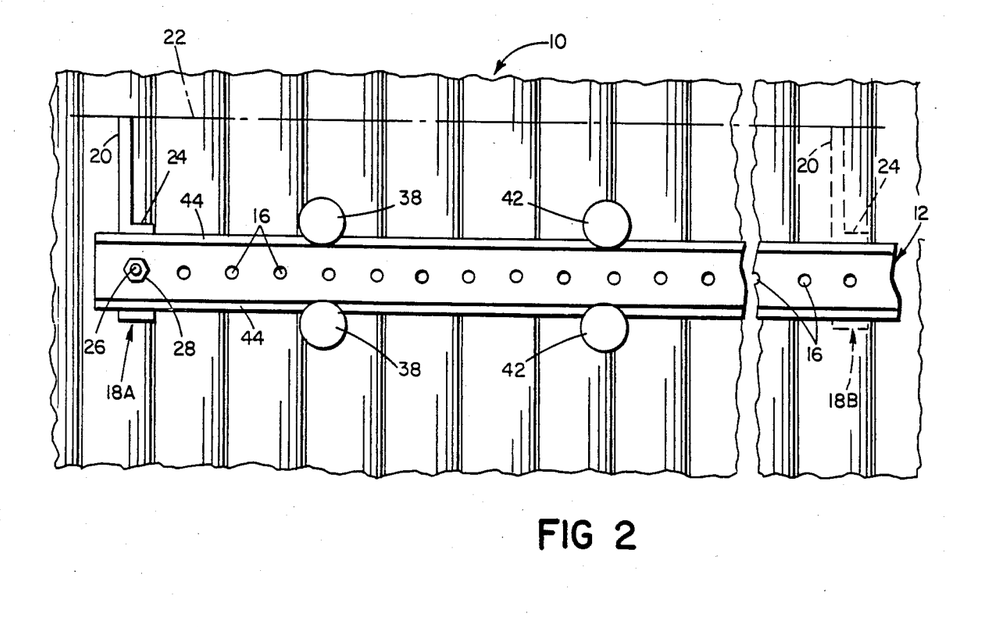
FIG. 2 is a side elevational view of the elongated guide rail component of the boiler tube repair system of FIG. 1.
Figure 3:
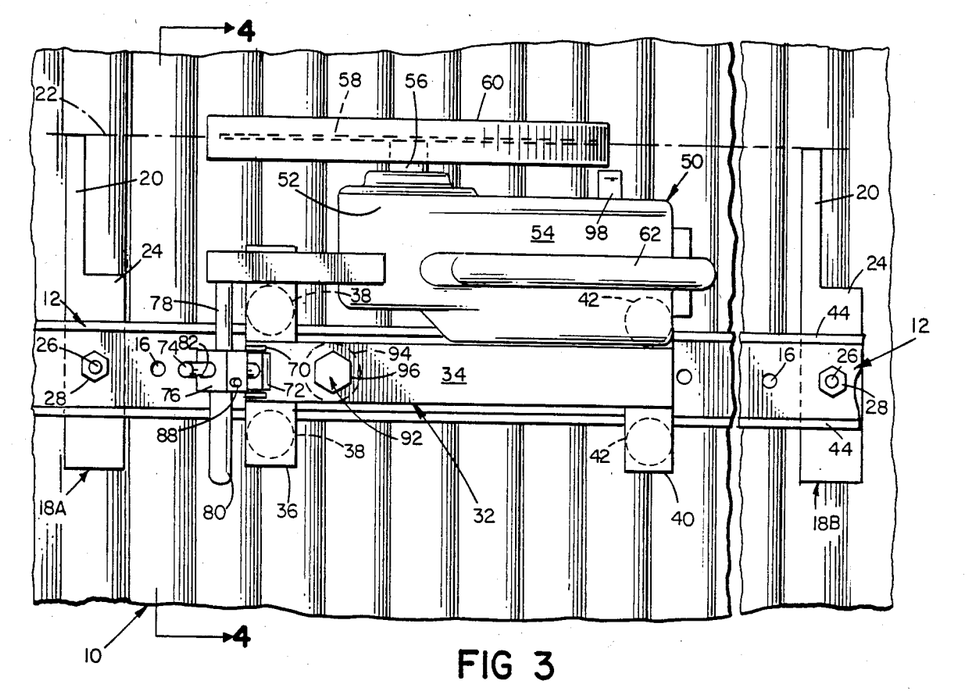
FIG. 3 is a side elevational view, similar to FIG. 2, showing tube cutting apparatus mounted on the guide rail.
Figure 4:
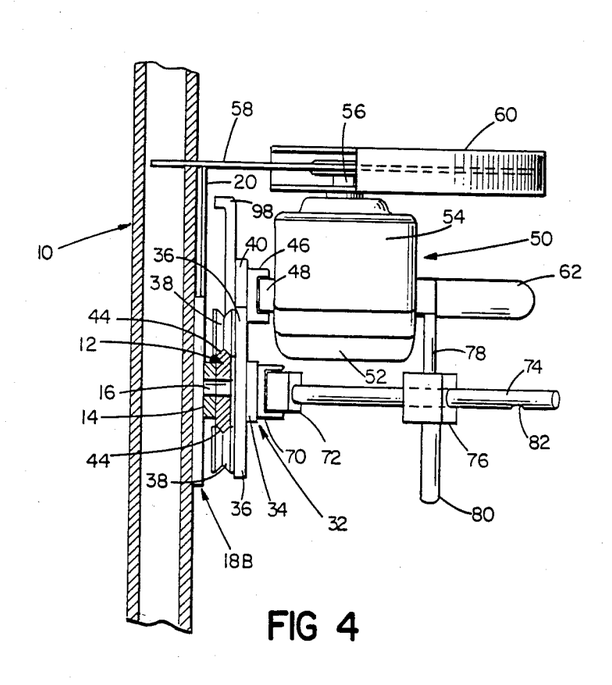
FIG. 4 is a sectional view taken along the line 4—4 of FIG. 3.
Figure 5:
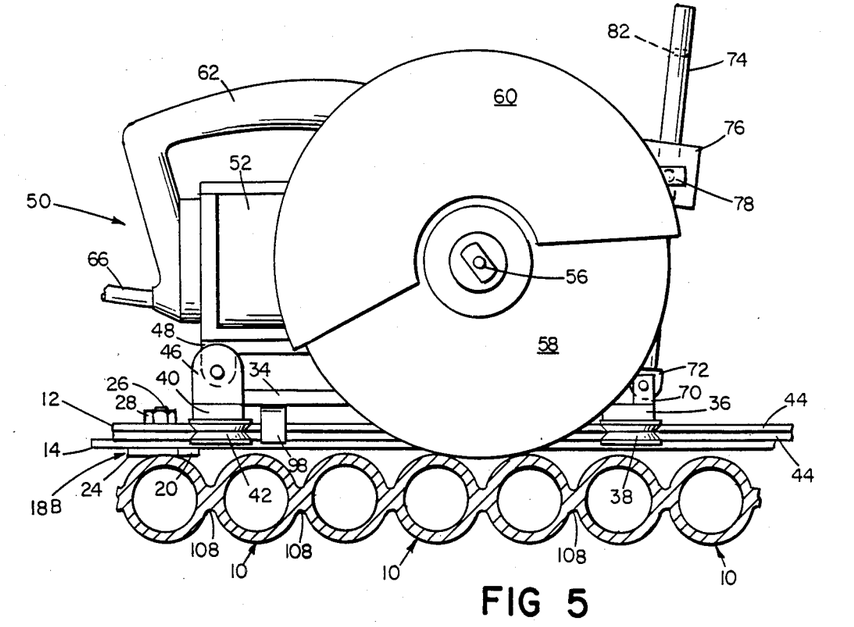
FIG. 5 is a top elevational view of the cutting tool system of FIG. 3.

Shown in FIG. 1 is a bank of boiler tubes 10 that includes a rectangular panel of tubes that is to be replaced. Mounted on the bank of tubes 10 is elongated guide rail 12. rail 12 includes a steel member about six feet in length and about 1¾ inch in width and about one quarter inch in thickness, and aluminum reinforcing plate 14 (FIG. 4) that is bonded to the rear surface of guide rail 12. Apertures 16 are spaced along the length of rail 12 at five inch intervals. Rail support members 18 are welded to the outer surface of spaced tubes as indicated in FIGS. 1 and 2. Each rail support 18 includes an alignment projection 20 whose end is positioned immediately adjacent the desired cut line 22 on the boiler tube panel; and a body portion 24 which is welded to a boiler tube surface and which carries an upstanding stud 26. Rail 12 is secured on supports 18 by nuts 28.

Mounted on rail 12 is tube cutting tool assembly 30 that includes carriage 32 which has longitudinal frame member 34, forward transverse frame member 36 on which a first pair of spaced guide wheels 38 are mounted for rotation, and rear transverse frame member 40 on which a second pair of spaced guide wheels 42 are mounted. Each guide wheel 38, 42 has a V-groove that engages a correspondingly shaped guide surface 44 of guide rail 12. Secured to rear transverse frame member 40 is main pivot bracket 46 which defines a pivot axis 47 perpendicular to rail 12 and on which support 48 is pivotably mounted. Secured to support 48 is cutting tool 50 that includes motor housing 52, drive gear housing 54, drive shaft 56 on which cutter disc 58 is secured, and protective disc housing 60. Tool 50 also has handle 62 which carries manually operable control switch 64. Power is supplied to motor 52 (a 5,000 rpm three horsepower motor) by heavy duty high amperage power supply cord 66.

Figure 6:
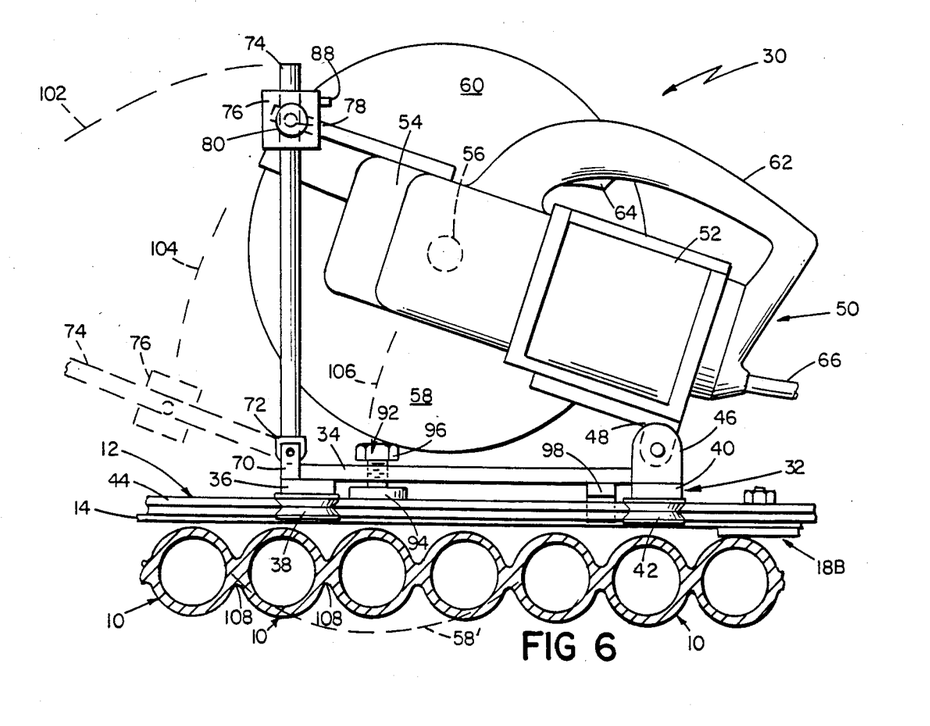
FIG. 6 is a diagrammatic view of the cutting tool system from the side opposite that of FIG. 5.

With reference to FIGS. 3–6, secured to forward transverse carriage frame member 36 is plunge cut pivot bracket 70 that carries pivot socket 72 in which is received plunge cut lever 74 for rotational movement about a pivot axis 71 that is defined by pivot bracket 70 and is parallel to axis 47. Slidingly received on lever arm 74 is plunge cut coupling 76 to which is rotatably attached support link 78 that is secured to the upper surface of gear housing 54. Plunge cut handle 80 is attached to coupling 76. Recess 82 in plunge cut lever 74 cooperates with a latch mechanism that includes a spring-biased latch member housed in coupling 76 that latches the cutting tool assembly 30 in raised position (as shown in FIG. 6) and is operable by latch actuator 88. The latch member is released by depression of latch actuator 88 to disengage the latch member from lever recess 82 and allow coupling 76 to slide along lever 74.

Mounted on longitudinal frame member 34 of the tool carriage is brake assembly 92 that includes brake shoe 94 and operating member 96, shoe 94 being movable by operating member 96 between a raised position (shown in FIG. 6) and a lower position (shown in FIG. 5) in which shoe 94 is engaged with the surface of guide rail 12 to lock the cutting tool assembly 30 in place on rail 12. Stand member 98 extends laterally from longitudinal frame member 34 and cooperates with guide wheels 38 to provide a stable support for the tube cutting tool assembly 30 on the floor or other surface when not in use.

Figure 7:
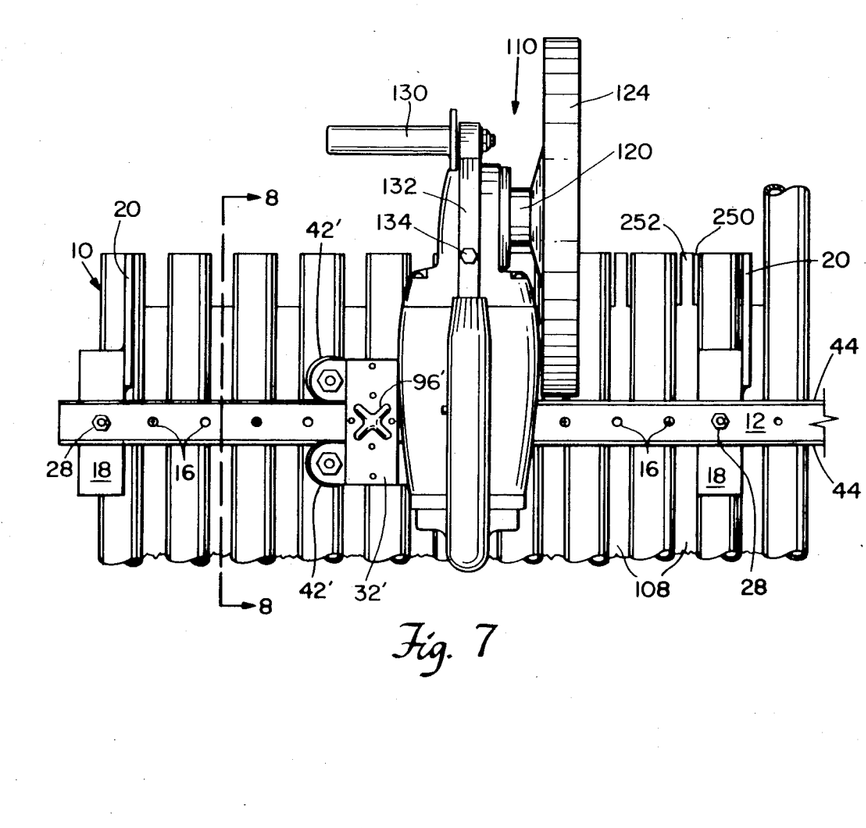
FIG. 7 is a side elevational view, similar to FIG. 2, showing membrane cutting apparatus mounted on the guide rail.
Figure 8:
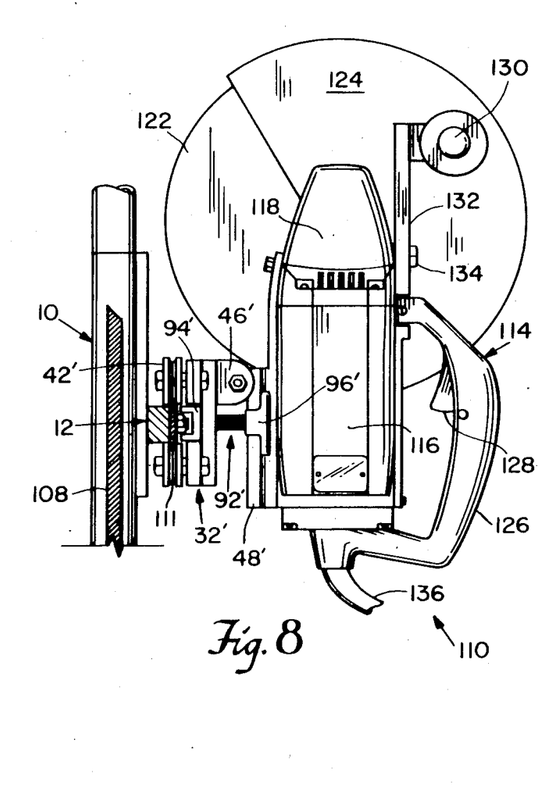
FIG. 8 is a sectional view taken along the line 8—8 of FIG. 7.
Figure 9:
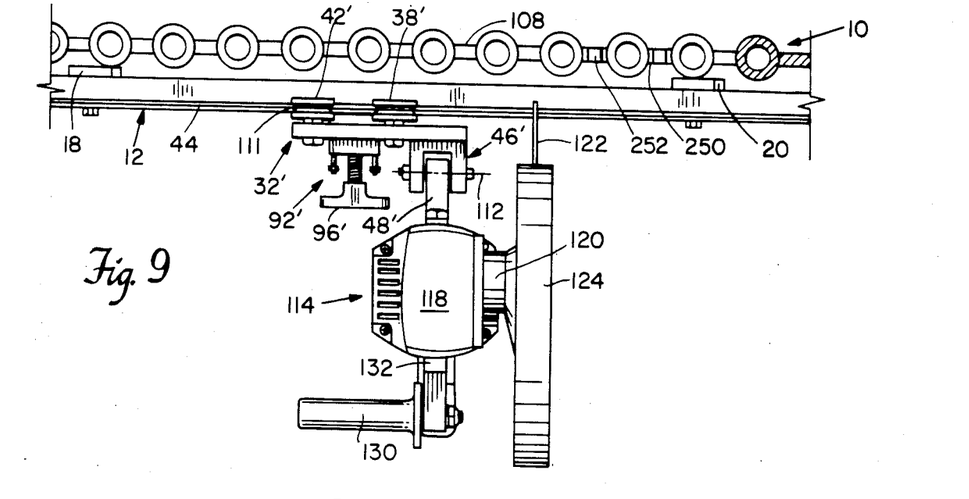
FIG. 9 is a top elevational view of the membrane cutting system of FIG. 7.

The system includes a second cutting tool assembly 110 for cutting membranes 108 between adjacent tubes 10. Details of that membrane cutting assembly 110 may be seen with reference to FIGS. 7-9. Membrane cutting assembly 110 includes carriage 32' on which two pair of spaced guide wheels 38', 42' are mounted. Each guide wheel 38', 42' (similar to guide wheels 38, 42 of tube cutting assembly 30) has a V-groove 111 that engages a correspondingly shaped guide surface 44 of guide rail 12 as indicated in FIG. 8. Secured to carriage 32' is pivot bracket 46' that has a pivot axis 112 parallel to rail 12 and on which tool support 48' is pivotable mounted. Cutting tool 114 is secured to support 48' and includes three horsepower 5,000 rpm motor 116, drive gear housing 118, drive shaft structure 120 on which cutter disc 122 is secured, and disc guard 124. Tool 114 also has handle 126 which carries manually operable control switch 128 and operating handle 130 which is secured to drive gear housing 118 by bracket 132 and bolt 134. Power is supplied to motor 116 through heavy duty high amperage power supply cord 136.

Mounted on carriage 32' is brake assembly 92' that includes brake shoe 94' and operating member 96', shoe 94' being movable by handle 96' between a raised position (shown in FIG. 8) and a lower position where shoe 94' engages guide rail 12 to lock the cutting tool assembly 110 in place on rail 12.

A third tool assembly 150 (for beveling tube ends) is shown in FIGS. 10-14. Beveling tool assembly 150 is adapted to cooperate with rail 12 similar to the other system tool assemblies 30 and 110. Tool assembly 150 includes support carriage 32'' which carries two pairs of spaced guide wheels 38'', 42'', each of which has a corresponding V-groove 111' that engages the correspondingly shaped guide surface 44 of guide rail 12. Tool assembly 150 includes elongated cylindrical rod 152 that is secured to carriage 32' by bolts 154 and nuts 156 and defines a pivot axis perpendicular to rail 12. Adjustably secured on rod 152 by clamp actuator 158 is stop member 160.

Tool support frame 170 includes rack gear 172 fixed between support members 174, 176, rack gear teeth 178 being in engagement with teeth 180 of pinion gear 182 that is mounted on gear support 168. Also mounted on support frame 170 is 1.8 horsepower, 90 psi, 15,000 rpm air motor unit 184 and cutter head 188 is coupled in offset relation through drive gear 186 such that drive motor 184 is located generally between the axis of cutter head 188 and the reference axis of shaft 152. Gear support 168 is fixed on shaft 152 by clamp frame 190 and bolt 192 such that the beveling tool motor unit 184, its gear drive 186 and offset cutter head 188 are allowed to swivel about the axis of shaft 152. The motor unit 184 and its support frame 170 are biased upwardly relative to clamp frame 190 by spring 194 to the position shown in FIG. 10. Secured to pinion gear 182 is actuating arm 196 that rotates pinion gear 182 to drive the engaged rack gear 172 downwardly, carrying motor support frame members 174, 176 and the air motor 184 with cutter head 188 downwardly. As the air motor and cutter head assembly is free to swivel about the axis of shaft 152, it can be aligned with a tube 10 whose end surface 200 is to be beveled.

Figures 10, 11, 12, 13:
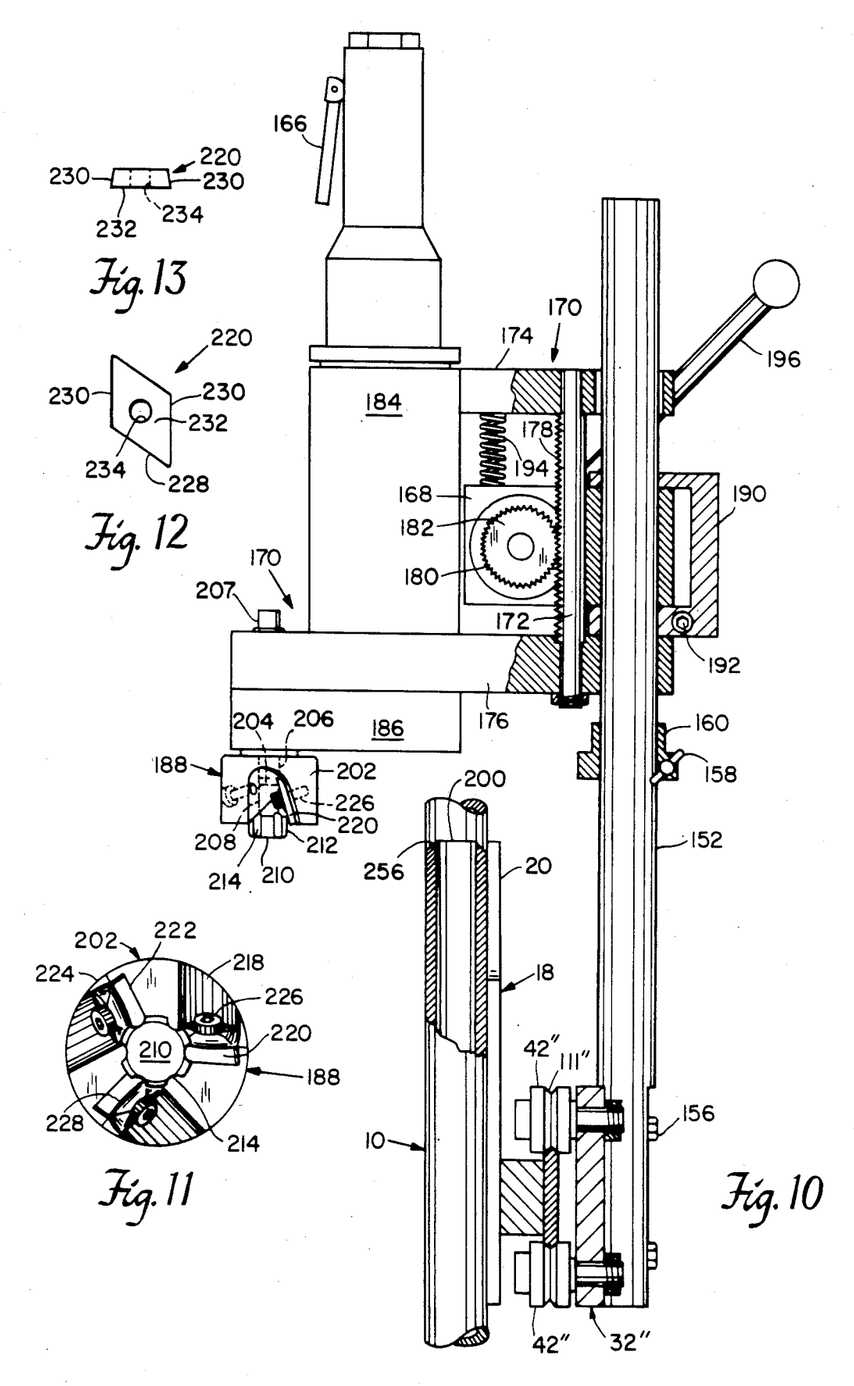
FIG. 10 is an end elevational view, similar to FIG. 4 and 8, showing tube end beveling apparatus mounted on the guide rail.
FIG. 11 is a bottom view of the tube beveling head employed in the assembly shown in FIG. 10.
FIG. 12 is a front elevational view of the carbide insert employed in the beveling head of FIG. 11.
FIG. 13 is a top view of the carbide insert employed shown in FIG. 12.

With reference to FIGS. 10-13, cutter head 188 has cylindrical body 202 with threaded through bore 204 that receives the threaded end 206 of shaft 207 of gear unit 186 at one end and threaded shaft portion 208 of pilot 210 at the other end. Pilot 210 has cylindrical body 212 of diameter corresponding to the inner diameter of tubes 10 whose end surfaces 200 are to be beveled and in which are formed axially extending grooves or recesses 214. Also formed in body 202 are recesses 218 that receive carbide cutter blade inserts 220. Each recess 218 has a base surface 222 that extends parallel to a radius of body 202 and sidewall surfaces 224 that are inclined outwardly at an angle of 10°. A carbide cutting insert 220 is secured in each recess 218 with fastener 226 so that its cutting edge 228 is inclined at a 37½° bevel angle. Each carbide blade insert 220 is of parallelogram configuration as indicated in FIG. 12 and has sidewalls 230, each of which is at a 10° angle to insert face 232 as indicated in FIG. 13, and through hole 234 for receiving fastener 226.

In repair of a defective portion of a boiler tube wall, the plunge cutting tool assembly 30 is used to sever the boiler tubes, horizontal and vertical cuts being made through the boiler tubes on four sides so that the rectangular panel of tubes to be replaced may be removed, the horizontal cuts exposing tube ends 220. The plunge cutting tool and its carriage 32 is then removed from rail 12, and the carriage 32' of membrane cutting assembly 110 is positioned on rail 12 and tool 114 is operated to cut membranes 108 adjacent those tube ends 220. After membranes 108 have been cut, assembly 110 is removed from rail 12 and carriage 32'' of the beveler unit 150 is mounted on the guide rail 14 and cutter head 188 is swiveled into alignment with tube ends 220 and operated to form bevels 254 for welding.

In system use, as indicated in FIGS. 1 and 2, an operator 100 (on vertically adjustable scaffolding—not shown) locates a desired cut line 22, welds a first rail support 18A to a boiler tube with the end of its alignment tab 20 immediately adjacent the cut line 22. Rail 12 is then mounted on the stud 26A of the fixed support 18A and secured with nut 28A. A second rail support 18B is then similarly loosely secured to rail 12 with securing nut 28B and its alignment tab 20B similarly positioned adjacent cutting line 22. The body of weld tab 18B is then tack welded in place on the boiler tube and the nuts 28A, 28B tightened on their respective coupling studs 26 to secure rail 12 parallel to, but offset from cut line 22. Rail 12 provides a fixed stable reference for the carriages 32, 32', 32'' of the plunge, membrane and bevel cut tools.

The plunge cutting tool assembly 30 is mounted on rail 12 by sliding guide wheels 38, 42 onto the rail edge surfaces 44, as indicated in FIG. 1, there being sliding clearance between transverse frame members 36, 40 and studs 26. In that position, cutter disc 58 is located in alignment with cut line 22. The tool carriage is then locked in place with brake assembly 92. Motor 50 is then energized with control switch 62 and the operator 100 releases latch 88 and urges handle 80 towards rail 12, rotating plunge cut lever 74 forward about the axis of pivot bracket 70 (as indicated in FIG. 1 and by line 102 in FIG. 6). That rotational movement of plunge cut lever 74 causes coupling 76 to slide along rod 74 along a path 104 (about the plunge cut axis of main pivot 46). As plunge cut lever 34 is rotated forwardly towards the boiler tubes, cutter disc 58 is moved along arc 106 into and cuts through the boiler tubes 10 and their interconnecting membranes 108 in a plunge cutting stroke (to a position indicated by dotted line 58' in FIG. 6). After the boiler tube plunge cut stroke has been completed, the operator 100 raises handle 80, rotating plunge cut lever 74 in the opposite direction to raise the cutting tool 50, and optionally latch the tool in raised position. After the cutter disc 58 is clear of the boiler tubes 10, the operator releases the brake 92 and advances the cutting tool assembly along rail 12 to reposition the assembly 30 for the next plunge cutting stroke.

Contiguous plunge cutting strokes are successively repeated to produce the cut line 22 as generally indicated in FIG. 1 (the cut line being straight but appearing to vary due to the location of the boiler tubes 10 in the boiler wall). After the series of contiguous plunge cuts have been made along the length of the rail, the cutter disk 58 may be energized and the tool rotated into the position 56', and the tool assembly 30 is then slid along the rail to provide a smooth linear cut surface 200 of the tubes 10 and membranes 108.

After similar horizontal and vertical cuts are made through the boiler tubes on four sides (the vertical cuts being through membranes 108), the resulting rectangular panel of tubes to be replaced is removed.

The plunge cut unit is then removed from rail 12 and the carriage 32' of the membrane cutting tool assembly 110 is positioned on the rail so that it utilizes the same basic fixed support and reference. Disc 122 of tool assembly 110 is aligned with one edge of a tube 10 and the tool assembly is locked in place by brake 92'. Motor 116 is energized, and the tool 114 is pivoted about its membrane cutting pivot axis 112 to make cuts 250 in membranes 108 at ends 200 of the immediately adjacent cut boiler tubes 10. Any remaining intermediate membrane portion 252 may then be snapped off with pliers or a similar device so that the entire circumferential end surface 200 is exposed for beveling prior to welding of the replacement panel tube.

Figure 14:
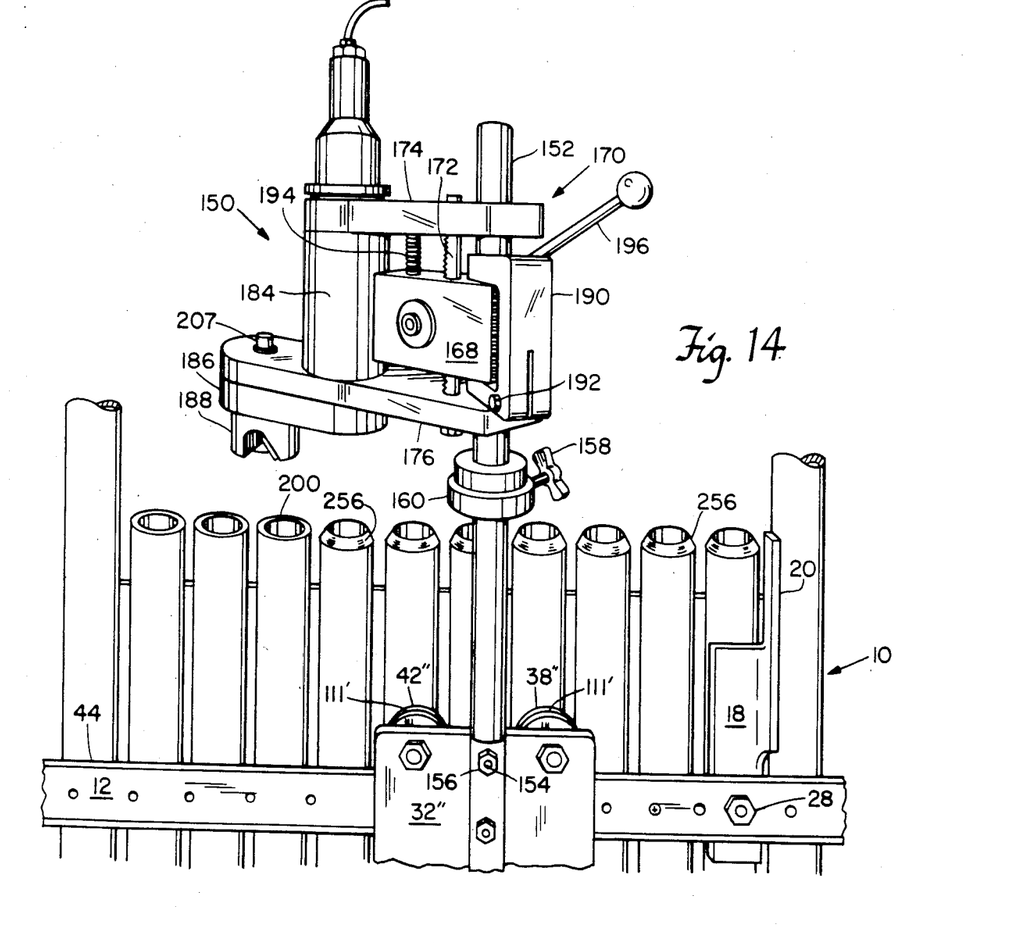
FIG. 14 is a perspective view of the tube beveling system shown in FIGS. 10 and 11.

This beveling is accomplished with the beveler tool 150 shown in FIGS. 10 and 14. After the membrane cutting tool assembly 110 is removed from rail 12, tool carriage 32" is inserted on rail 12 as indicated in FIGS. 10 and 14.

The beveler tool 150 is then swiveled about the axis of support post 152 to align cutter head 188 with the end 200 of a tube 10 to be beveled so that the pilot 210 may be inserted into the inner diameter of the tube 10. Actuation of throttle control 166 energizes air motor 184 to rotate cutter head 188 at 15,000 rpm and depression of operating handle 196, moves head 188 down, inserting pilot 210 into tube to stabilize the cutter head 188. The high speed (15,000 RPM) rotation of carbide inserts 220 provides rapid effective cutting of end surface 200 to provide 37½° bevel surface 254, the depth of the bevel being controlled by stop 160. After the bevel is completed, the assembly is returned to its initial position by spring 194.

In another beveler tool embodiment, the beveler tool is hand-held and similarly includes a high speed cutter head 188 with pilot 210 which is inserted into the ID of the tube to be end prepped, and drive motor 166. Such a hand-held tool may carry an adjustable projecting stop that is aligned with rail 12 or other reference to control the depth of the beveling action.

The system provides accurate and efficient cutting of tubes of a defective boiler tube panel of tubes and subsequent end prepping with resulting aligned end-prepped tube surfaces prepared for insertion of a replacement panel that is then welded in place.

While a particular embodiment of the invention has been shown and described, various modifications thereof will be apparent to those skilled in the art, and therefore it is not intended that the invention be limited to the disclosed embodiment, or to details thereof, and departures may be made therefrom within the spirit and scope of the invention.

What is claimed is:

1. Boiler tube repair apparatus comprising elongated guide rail structure for securing to a boiler tube panel adjacent a repair region, and an end prep tool assembly for mounting on said guide rail structure, said end prep tool assembly including carriage structure with guide structure for engaging said guide rail structure for movement there along reference axis defining structure secured to said carriage structure having a reference axis extending transversely to said guide rail structure, an end prep tool mounted on said reference axis defining structure for swiveling movement about said reference axis, said end prep tool including a drive motor, a manual motor control, a drive shaft and a cutter head mounted on said drive shaft for rotation about an axis parallel to said reference axis, and a drive arrangement coupled between said reference axis defining structure and said end prep tool for moving said cutter head along a path parallel to said reference axis to end prep the end of a boiler tube.

2. The repair apparatus of claim 1 wherein said drive arrangement includes a first component secured to said reference axis defining structure and a second component secured to said end prep tool and cooperating with said first drive component to move said end prep tool along said path parallel to said reference axis.

3. The repair apparatus of claim 1 wherein said drive motor is adapted to drive said cutter head in rotation at a speed of at least about ten thousand rpm.

4. The repair apparatus of claim 1 wherein said cutter head includes a plurality of cutter blade inserts, a body, and a plurality of recesses in said body for receiving said cutter blade inserts, each said recess having configured sidewalls so that said cutter blade inserts can be inserted only in proper orientation.

5. The repair apparatus of claim 1 wherein said cutter head includes a plurality of cutter blade inserts, a body, and a plurality of recesses in said body for receiving said cutter blade inserts, each said recess having inclined sidewalls that mate with corresponding inclined sidewalls of said blade inserts and contribute to the secure positioning of said blade inserts in said recesses.

6. The repair apparatus of claim 1 wherein said reference axis defining structure includes post structure fixedly secured to and upstanding from said guide structure, said end prep tool is mounted on said post structure for swiveling movement about said post structure, and further including biasing means for urging said end prep tool upwardly along said post structure, and said drive arrangement is adapted to move said end prep tool downwardly along said post structure in opposition to the biasing force of said biasing means 7. The repair apparatus of claim 1 wherein said cutter head includes a pilot projection coaxial with the axis of rotation of said cutter head, said pilot projection being a one-piece member fixed for rotation with said cutter head and having a circumferential surface adapted to be received within the inner diameter of the boiler tube whose end surface is to be prepped, said pilot projection having an array of axially-extending recesses spaced about its said circumferential surface.

8. The repair apparatus of claim 7 and further including a gear unit that couples said cutter head in offset relation to said drive motor such that the axis of said cutter head is disposed outwardly of said drive motor, and said drive motor is adapted to drive said cutter head in rotation at a speed of about 15,000 rpm and said cutter head includes a plurality of tube end beveling inserts, a body, and a plurality of recesses in said body for receiving said tube end beveling blade inserts, each said recess having inclined sidewalls that mate with corresponding inclined sidewalls of said tube end beveling inserts so that said tube end beveling inserts can be secured in proper orientation in said recesses.

9. The repair apparatus of claim 8 wherein said drive arrangement includes a first gear component secured to said reference axis defining structure and a second gear component secured to said end prep tool and cooperating with said first gear component to move said cutter head along said path parallel to said reference axis.

10. An end prep tool assembly for boiler tube repair comprising a drive motor, a manual motor control, a drive shaft, a cutter head mounted on said drive shaft for rotation about an axis, said cutter head including a plurality of cutter blade inserts, each said cutter blade insert having a cutting edge, parallel opposed main surfaces and configured sidewall surfaces, a body, a plurality of recesses in said body for receiving said cutter blade inserts, each said recess having a base surface and configured side walls so that a main surface of each said cutter blade insert can be only seated on the base surface of its recess with said configured sidewalls of the insert and its recess in mating relation such that its said cutting edge is in proper orientation, fastener means for securing said cutter blade inserts in said recesses, said drive motor being adapted to drive said cutter head in rotation at a speed of at least about ten thousand rpm, and a gear unit that couples said cutter head to said drive motor such that the axis of said cutter head is disposed outwardly of and in offset relation to said drive motor.

11. The end prep tool assembly of claim 10 wherein each said cutter blade insert has inclined sidewalls, and, said sidewall surfaces of each said recess are inclined outwardly from one another and mate with corresponding inclined sidewalls of said blade inserts and contribute to the secure positioning of said blade inserts in proper orientation in said recesses.

12. An end prep tool assembly for boiler tube repair comprising a drive motor, a manual motor control, a drive shaft coupled to said drive motor, a cutter head mounted on said drive shaft for rotation about an axis, said cutter head including a plurality of cutter blade inserts, a body a plurality of recesses in said body for receiving said cutter blade inserts, each said recess and each said cutter blade insert having configured side walls that mate with one another so that each said cutter blade insert can be seated in a corresponding one of said recesses only in proper orientation, fastener means for securing said cutter blade inserts in said recesses, said drive motor being adapted to drive said cutter head in rotation at a speed of at least about ten thousand rpm, said cutter head further including a one-piece pilot projection coaxial with the axis of rotation of said cutter head, said pilot projection being fixed for rotation with said cutter head and having a circumferential surface adapted to be received within the inner diameter of the boiler tube whose end surface is to be prepped, said pilot projection having an array of axially extending recesses spaced about its circumferential surface.

13. The repair apparatus of claim 7 wherein said reference axis defining structure includes post structure fixedly secured to and upstanding from said guide structure, said end prep tool is mounted on said post structure for swiveling movement about said post structure, and further including biasing means for urging said end prep tool upwardly along said post structure, and said drive arrangement is adapted to move said end prep tool downwardly along said post structure in opposition to the biasing force of said biasing means, and wherein said drive motor is adapted to drive said cutter head in rotation at a speed of at least about ten thousand rmp.

14. The end prep tool assembly of claim 10 wherein said cutter head includes a pilot projection coaxial with the axis of rotation of said cutter head, said pilot projection being fixed for rotation with said cutter head and having a circumferential surface adapted to be received within the inner diameter of the boiler tube whose end surface is to be prepped, said pilot projection having an array of axially extending recesses spaced about its circumferential surface and said drive motor is adapted to drive said cutter head in rotation at a speed of about 15,000 rpm and each said cutter blade insert has inclined sidewalls, and said sidewall surfaces of each said recess has inclined sidewalls that mate with corresponding inclined sidewalls of said blade inserts so that said blade inserts can be secured in proper orientation in said recesses.

* * * * *